United States Patent [19]
Goodman et al.

[11] 3,764,525
[45] Oct. 9, 1973

[54] METHOD FOR REMOVING SUSPENDED SOLIDS FROM LIQUIDS

[75] Inventors: Brian L. Goodman; James W. McKibben, both of Overland Park, Kans.

[73] Assignee: Ecodyne Corporation, Chicago, Ill.

[22] Filed: Jan. 30, 1970

[21] Appl. No.: 7,171

[52] U.S. Cl. .................. 210/15, 210/75, 210/76, 210/407, 210/499
[51] Int. Cl. .................................. B01d 37/04
[58] Field of Search ............ 210/3–10, 15, 194–197, 210/220, 221, 60, 76, 75, 407, 499

[56] References Cited
UNITED STATES PATENTS

| | | | |
|---|---|---|---|
| 3,575,850 | 4/1971 | Davidson et al. | 210/15 |
| 3,440,669 | 4/1969 | Boester | 210/15 X |
| 3,543,294 | 11/1970 | Boester | 210/15 |
| 3,051,315 | 8/1962 | Boester | 210/15 X |
| 3,530,990 | 9/1970 | Grimshaw | 210/199 |
| 3,398,088 | 8/1968 | Okey | 210/7 X |
| 2,830,947 | 4/1968 | Griffith | 210/195 X |
| 2,407,303 | 9/1946 | Teale | 210/433 X |

Primary Examiner—Michael Rogers
Attorney—Hume, Clement, Hume and Lee

[57] ABSTRACT

The invention provides a method and apparatus for removing suspended solids from liquids. In carrying out the method, a liquid containing suspended solids is delivered to a screen with a directional component across the screen surface and a directional component through the screen. The screen has openings that are large enough to pass a majority of the suspended solids, and the screen has the ability to hold a layer of the solids on the upstream side thereof. The flow of the liquid is controlled so that the coating is formed and maintained on the screen, and serves as a filtration medium. The invention also provides improved apparatus which comprises means defining a liquid filtration zone having a screen separating it into influent and effluent zones. The screen has openings large enough to pass the majority of suspended solids and has the ability to hold a layer of the solids on the upstream side. Means are provided for delivering liquids and suspended solids to the screen with a directional component parallel to the face of the screen and a directional component through the screen.

15 Claims, 9 Drawing Figures

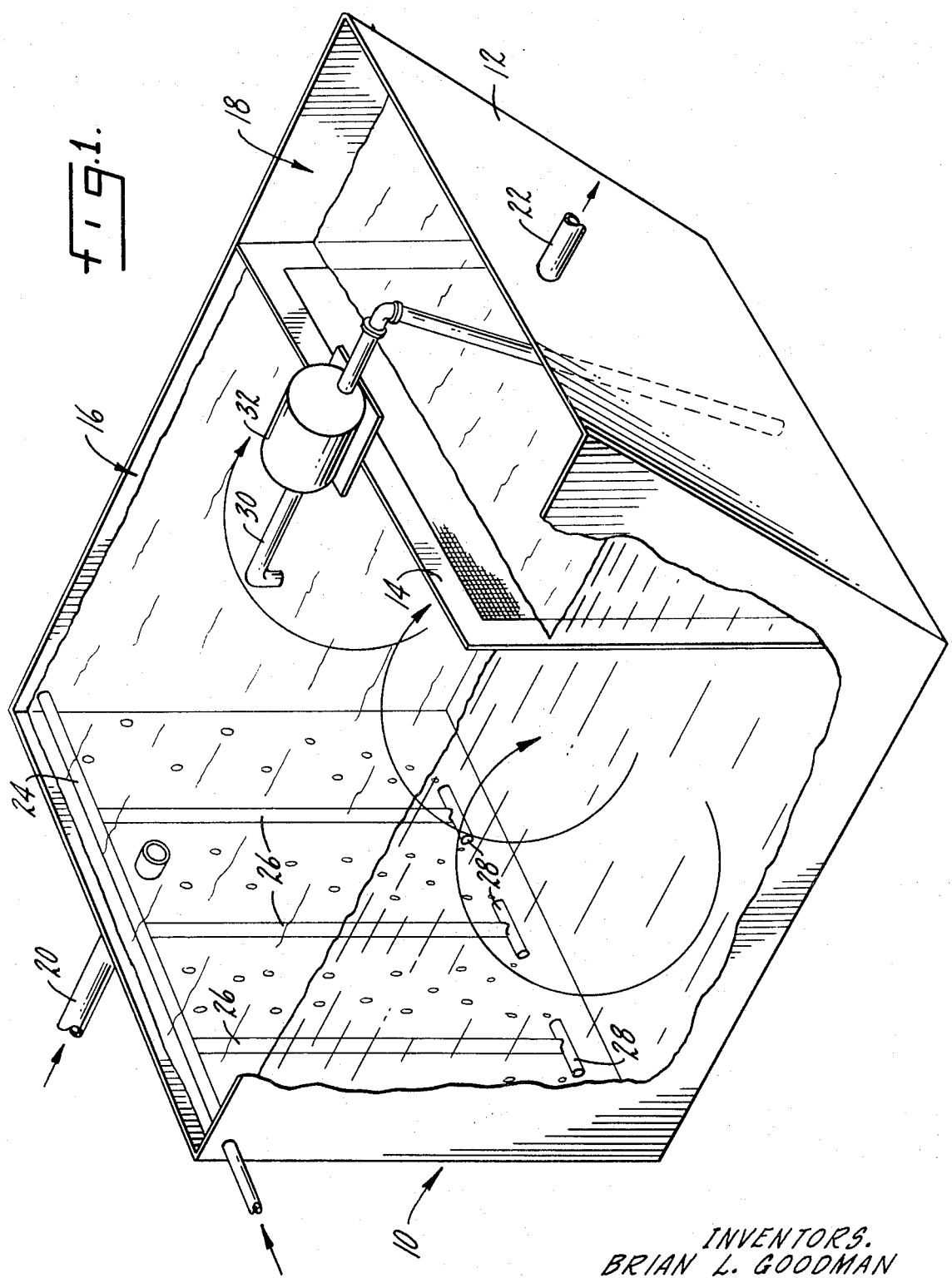

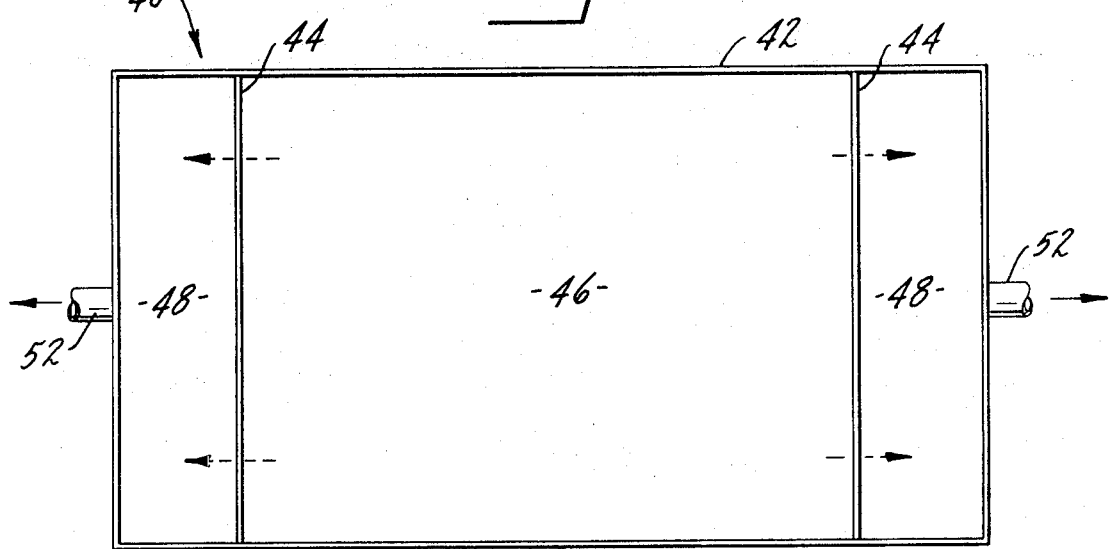
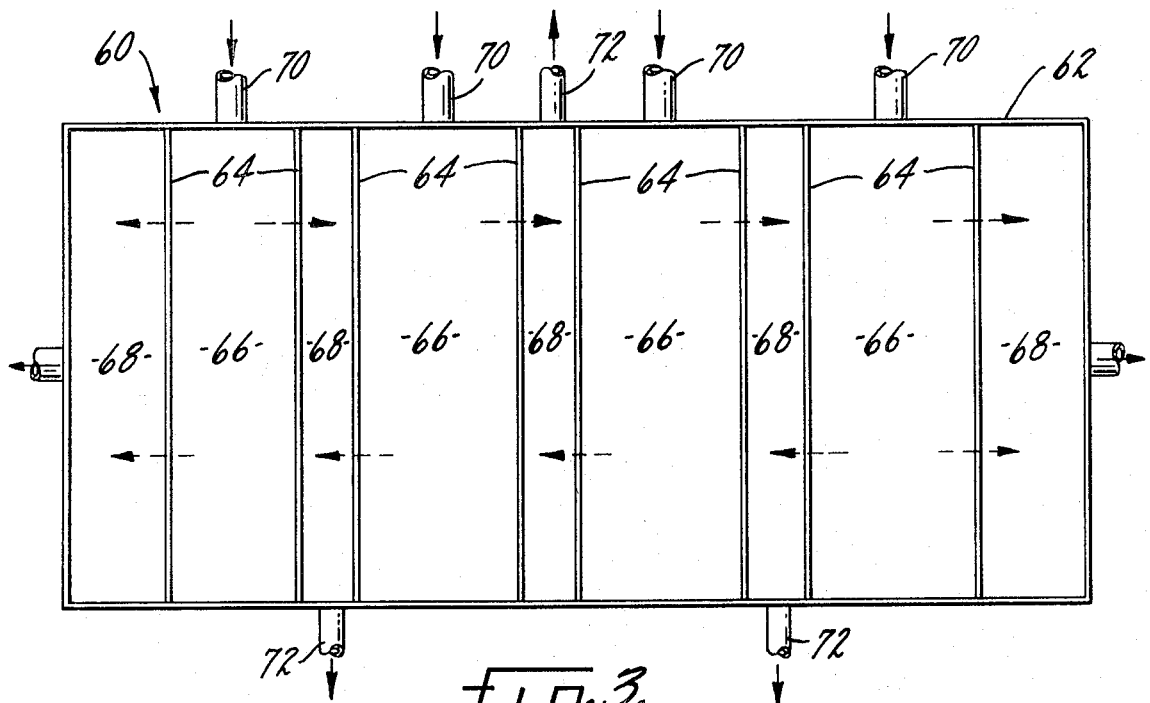

INVENTORS.
BRIAN L. GOODMAN
JAMES W. McKIBBEN
BY Hume, Clement, Hume & Lee
Attorneys.

METHOD FOR REMOVING SUSPENDED SOLIDS FROM LIQUIDS

The present invention relates to an improved method and apparatus for removing suspended solids from liquids.

The avoidance of water pollution by industrial and municipal wastes is becoming an increasingly important subject. A wide variety of equipment has been developed for removing suspended solids from liquids. Such equipment includes gravity-type clarifiers, pressure flotation units, centrifuges, filters, and other devices having varying degrees of complexity, as is well known to those skilled in the art. However, such systems suffer from a number of disadvantages, including high cost, tendency to fail, low efficiency, and large space requirements.

Generally, the present invention provides an improved method for removing suspended solids from liquids by utilizing a screen having a coating of the solids thereon. In carrying out the method, liquid containing suspended solids is delivered to the screen with a directional component across the screen surface and a directional component through the screen. The screen has openings that are large enough to pass a majority of the suspended solids being filtered, but is constructed of a material that has the ability to hold a coating of the solids primarily on the upstream side thereof. The flow of the liquid containing the suspended solids is controlled so that a coating of the solids is formed on the screen. After the coating is formed, the delivery of liquid containing suspended solids is continued, with a directional component across the screen and a directional component through the screen, so that solids are filtered from the liquid passing through the coating and screen. During the process, the directional components of the liquid across and through the coating and screen are controlled to maintain the coating on the screen, while preventing the buildup of an excessively thick coating.

The invention also provides apparatus for carrying out the above-described method, generally comprising means defining liquid filtration zone and a screen separating the liquid filtration zone into influent and effluent zones. The screen has openings large enough to pass a majority of the suepended solids that are to be removed from the liquid, but has the ability to hold a layer of the solids on the upstream side thereof. Means are provided for delivering liquid and suspended solids to the screen with a directional component across the screen and a directional component through the screen.

The invention, its construction and method of operation, together with the objects and advantages thereof, will be best understood by reference to the following detailed description, taken together with the drawings, in which:

FIG. 1 is a perspective view of an apparatus embodying the present invention, partially cut away to show the interior details thereof;

FIG. 2 is a plan view of another embodiment of the present invention;

FIG. 3 is a plan view of another embodiment of the present invention;

Figure 4:
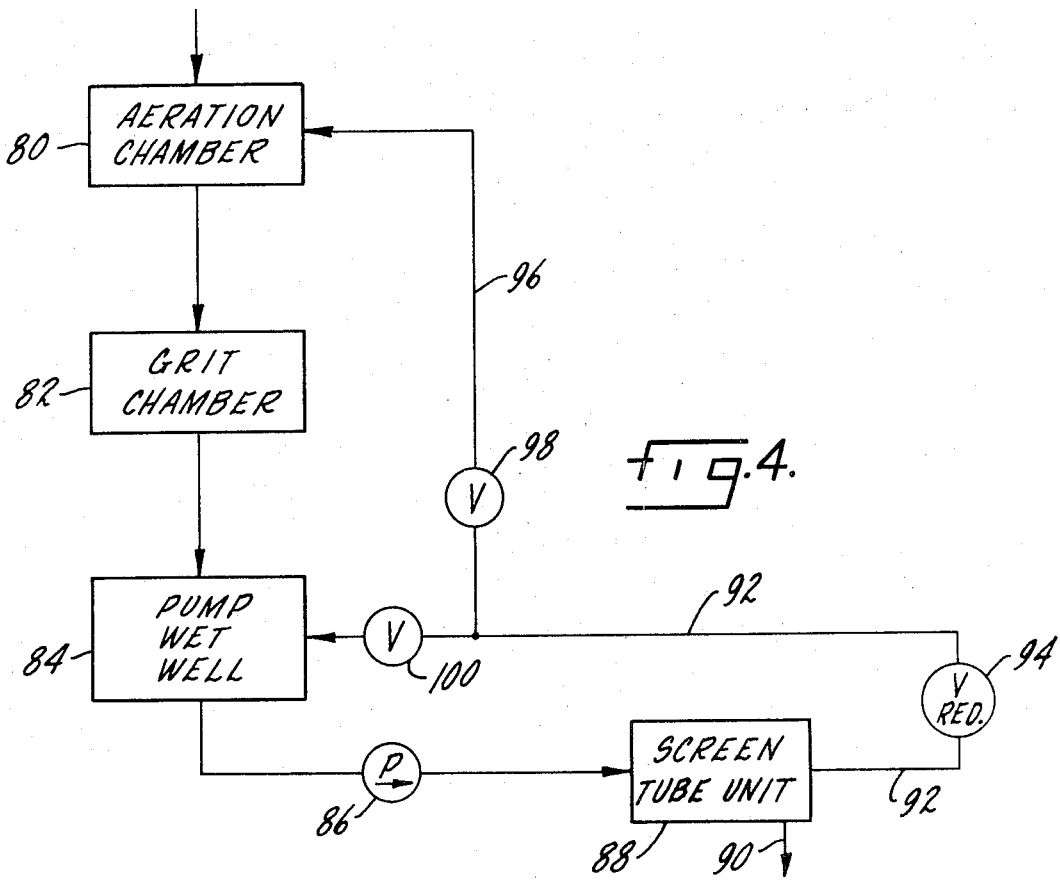
FIG. 4 is a flow chart illustrating the construction and operation of a system for use with certain embodiments of the present invention.

The present invention is based upon the surprising discovery that suspended solids that are to be filtered from a liquid can be employed to form a thin coating on the surface of a screen through which a majority of these solids would normally be expected to pass, simply by properly selecting the screen material for the suspension being filtered, by controlling the size of the openings of the screen within the proper range, and by delivering the liquid containing suspended solids to the screen with a directional component parallel to the screen and a directional component through the screen. In this manner, the solids that are to be filtered from the liquid themselves form a filtration medium. An important advantage of this method is that the filter is, in effect, self-cleaning, and shutdowns of the apparatus for filter cleaning are not necessary.

First, the screen should be made of a material that is capable of holding a coating of the suspended solids that are to be removed from the liquid. While a wide variety of screen materials may be employed, including natural and synthetic substances, the preferred materials for the screen are synthetic organic polymers, such as polyethylene, polypropylene, nylon, and Dacron, the preferred polymers being nylon and Dacron. Dacron is a trademark for a synthetic polyester fiber made from methyl terephthalate and ehtylene glycol, and marketed by E. I. du Pont de Nemours & Company.

The size of the openings in the screen should also be controlled within the proper range. If the openings are too small, the flow of liquid through the screen will be significantly hampered, and the screen will tend to become clogged. Thus, it is important that the openings be at least large enough to pass the majority of the suspended solids that are to be filtered from the liquid. On the other hand, it is important that the openings of the screen not be too large, since openings that are too large will hamper the ability of the screen to hold the solids coating. Of course, the screen openings must be adjusted to the particular process conditions encountered, including the volume of solids that can be tolerated in the effluent stream, and the particle size and nature of the suspended solids. As a general matter, the openings should be in the range of about 10 to 100 microns. In the preferred embodiment, for most waste removal applications, a screen opening size in the range of about 50 to 90 microns is preferred.

The weave pattern of the screen is not critical. Suitable patterns that may be employed in the present invention include plain square, twilled square, plain Dutch, twilled Dutch, basket weave, etc. In the case of a plain square weave, the size of the openings is easily calculated once the gauge (thickness) of the strands and the number of strands per centimeter are known. In this instance, the opening size is expressed in terms of the length of the square opening along one side. For more complex weave patterns the size of the openings may be determined in accordance with the bubble test method set forth in S.A.E. Standard ARP-901 (April, 1968).

The directional components of the liquid containing the suspended solids parallel to the filter and through the filter must also be properly controlled in order to maintain the correct coating layer. Again, these variables must be adjusted to each individual situation, so that it is difficult to generalize upon the optimum figures. However, it may generally be said that the directional component across the screen and coating layer should not be greater than about 10 feet per second, and preferably should not be greater than about 5 feet per second. In the case of most wastes, the directional component across the screen should be in the range of about 1 to 3 feet per second.

The directional component through the screen and coating should, as a general matter, vary in the range of about 4 to 300 gallons per day per square foot of screen surface area. Preferably, in the case of most suspended solids, the directional component through the filter should be in the range of about 5 to 50 gallons per day per square foot of screen surface area.

Referring to the drawings, FIG. 1 shows a waste treatment apparatus, generally indicated by reference numeral 10, constructed in accordance with the present invention. The waste treatment apparatus 10 in this instance is designed to remove biodegradable impurities by an activated sludge process, followed by filtration. The waste treatment apparatus 10 comprises a tank 12, which is separated by a screen 14 into an influent compartment or zone 16 and an effluent compartment or zone 18. An inlet pipe 20 communicates with an upper portion of the influent zone 16, while an outlet pipe 22 communicates with an upper portion of the effluent zone 18. Unless the influent zone 16 is enclosed and pressurized, the outlet pipe 22 should be positioned below the level of the inlet pipe 20 in order to build up a head differential across the screen 14 to allow liquid to flow from the influent zone 16 to the effluent zone 18.

In the apparatus shown, the influent zone 16 also forms an aeration chamber, and accordingly has suitable aeration means, in this instance defined by a cross pipe 24 and three down pipes 26, which are connected to horizontal air outlet pipes 28 at the bottom. Air is introduced into the water and suspended solids in the influent zone 16, producing a tumbling motion in the water as indicated by the arrows, so that there is a velocity component in the water parallel to the surface of the screen 14. At the same time, a directional component through the screen 14 is produced by the difference in heads between the input zone 16 and the effluent zone 18. It is preferred to locate the air outlet pipes 28 far enough from the screen 14 to avoid air scrubbing of the screen, which could cause partial removal of the coating layer.

A small amount of solids will ordinarily pass through the screen 14 into the effluent zone 18. Accordingly, in the embodiment shown, tank 12 is shaped so that the effluent zone 18 is narrower at the bottom than at the top in order to concentrate these solids. The solids are periodically returned to the influent zone 16 through a solids return pipe 30 having a pump 32, providing communication between the bottom of the effluent zone 18 and the influent zone 16.

FIG. 2 shows a second apparatus constructed in accordance with the present invention, generally indicated by reference numeral 40. The apparatus 40 has a tank 42 which has a pair of screens 44, one near each end thereof. The screens 44 separate the tank 42 into a central influent zone 46 and a pair of effluent zones 48 at each end of the tank. Water containing suspended solids is delivered to the influent zone 46 through an inlet pipe 50, and is removed from the effluent zones 48 through a pair of outlet pipes 52. As with the embodiment shown in FIG. 1, the embodiment of FIG. 2 has an air input system (not shown), which may be of conventional design such as that shown in FIG. 1. The air input system should be designed to produce a tumbling motion in the water in order to produce a directional component parallel to the surface of the screens 44. As with the embodiment shown in FIG. 1, movement of water through the screen, as shown by the arrows, is produced by the difference in pressure head between the influent zone 46 and the effluent zones 48.

FIG. 3 shows yet another embodiment of the present invention, wherein there are a plurality of screens, influent zones, and effluent zones. This second modified apparatus is indicated generally by reference numeral 60. As shown in the drawing, the apparatus 60 comprises a tank 62 having a plurality of vertical screens 64 separating the tank into a plurality of influent zones 66 and effluent zones 68. Each influent zone 66 has an inlet pipe 70 communicating therewith, while each effluent zone has an outlet pipe 72. As with the embodiments shown in FIGS. 1 and 2, the second modified apparatus 60 has means (not shown) for aerating the liquid and suspended solids in the influent zones 66, as well as means to produce a suitable directional component parallel to the screen's surface.

The operation of the apparatus shown in FIGS. 1-3 is basically the same. The influent zones of the various apparatus will contain activated sludge, while solid material will be filtered out in passing the liquid from the influent zone to the effluent zone. The operation of the method, as heretofore described, is controlled by controlling the velocity of the liquid parallel to the screen and through the screen. As previously mentioned, the velocity parallel to the screen is a function of the speed at which the liquid is caused to tumble by the air injection, and this variable is therefore controlled by controlling the speed at which air is injected. The movement of water through the screen is controlled by the difference in pressure heads between the influent zone and the effluent zone.

The apparatus shown in FIGS. 1-3 may be modified to pressurize the influent zone simply by covering the influent zone and providing an outlet valve for the air. The pressure within the influent zone could therefore be regulated by regulating the air pressure.

The second general embodiment of the present invention uses a tubular screen, referred to herein as a "screen tube," instead of the planar screen shown in FIGS. 1-3. The screen tube separates the means that define the liquid filtration zone into an influent zone and an effluent zone. The influent zone may be defined by the interior of the tube, in which case the effluent zone would be defined by the area surrounding the tube. However, this arrangement may be reversed, so that the area surrounding the tube constitutes the influent zone, while the interior of the tube forms the effluent zone. In any event, it is essential that liquid containing suspended solids be delivered to the screen tube under pressure so that there will be a directional component through the tube, while the liquid and suspended solids also flow parallel to the surface of the tube. Ordinarily, this pressure will be provided by a pump.

FIG. 4 shows a suitable flow diagram for use in connection with the screen tube type of embodiment shown in FIGS. 5-9. This flow diagram shown in FIG. 4 is designed for use with activated sludge, and therefore includes aeration means. The wastes are delivered first to a conventional aeration chamber 80, where the liquid and suspended solids are aerated. The liquid and suspended solids are then transferred to a grit chamber 82, where readily settleable materials such as sand and glass are removed. From that point, the liquid and suspended solids are delivered to a pump wet well 84 and then to a pump 86. The pump wet well 84 contains a sufficient amount of liquid to keep the pump 86 primed, so that an even flow to the screen tube unit is maintained. The liquid and suspended solids are delivered by the pump 86 to the influent zone defined by a screen tube unit 88. Various embodiments for such a screen tube unit 88 are shown in FIGS. 5-8, hereinafter discussed. A coating of solids is formed within the screen tube unit 88, and liquid is filtered through this coating, passing to the effluent zone defined by the screen tube unit 88 to a filtered liquid outlet pipe 90. The remainder of the liquid, which will be concentrated in its solids content, passes out of the influent zone through a concentrate outlet pipe 92. The concentrate outlet pipe 92 has a pressure reduction valve 94 to maintain the proper pressure within the influent zone of the screen tube unit 88. The liquid, which has been concentrated in its suspended solids content, will ordinarily be returned to the aeration chamber 80 through a recycle pipe 96 having a recycle valve 98. However, the liquid and suspended solids can optionally be returned to the pump wet well 84 by closing the recycle valve 98 and opening a pump wet well return valve 100 on the concentrate outlet pipe 92, which communicates back with the pump wet well 84. The recycle of liquid containing suspended solids through the pump wet well 84 may be desirable, for example, when building up a coating on the screen tube 88. Furthermore, if, for some reason, it is desired to shut down flow from the aeration chamber, flow should be maintained through the screen tube unit 88 by recycling through the pump wet well 84. Since the method of the present invention depends upon the maintenance of the proper dynamic conditions in order to maintain a proper coating layer, it is important that flow through the screen tube unit 88 not be interrupted.

Figure 5:
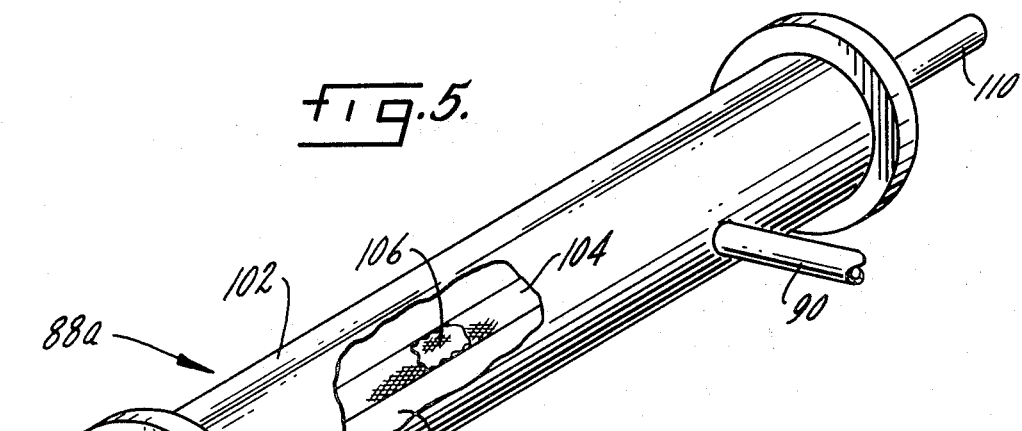
FIG. 5 is a perspective view of another embodiment of the present invention, partially cut away to show the interior details thereof.

FIGS. 5-8 show suitable screen tube units 88a-88d for use in accordance with the present invention. Referring to FIG. 5, the screen tube unit 88a comprises an outer encasing tube 102 and an internal screen tube 104. The screen tube 104 separates the unit into an influent zone 106, defined by the interior of the screen tube 104, and an effluent zone 108 defined by the encasing tube 102 and the outside wall of the screen tube 104. Liquid containing suspended solids is delivered to the influent zone 106 through an inlet pipe 110 communicating with the interior of the screen tube 104. A coating is formed on the interior of the screen tube 104, suspended solids are filtered from the liquid as it passes through the screen tube 104 into the effluent zone 108, and eventually to the filtered liquid outlet pipe 90, corresponding to the filtered iquid outlet pipe 90 shown in FIG. 4. The liquid that has not passed to the effluent zone 108 will be concentrated in solids, and will pass through the concentrate outlet pipe 92.

Figure 6:
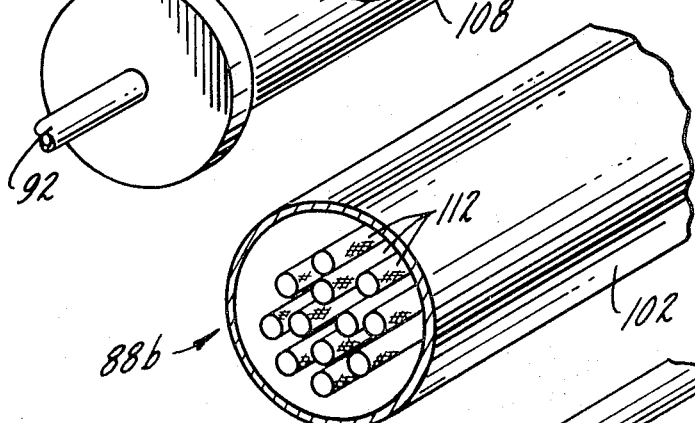
FIG. 6 is a sectional perspective view of another embodiment of the present invention.
Figure 7:
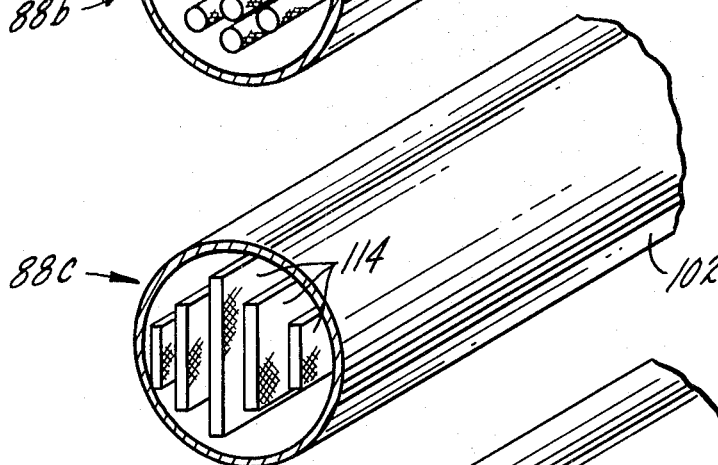
FIG. 7 is a sectional perspective view of another embodiment of the present invention.
Figure 8:
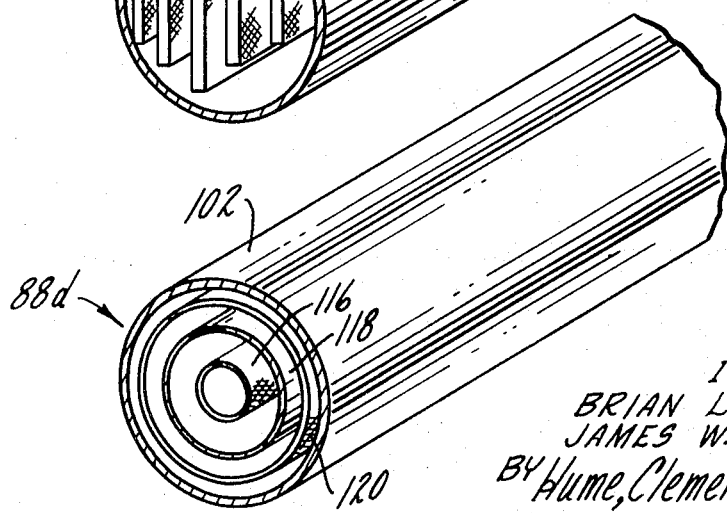
FIG. 8 is a sectional perspective view of another embodiment of the present invention.

FIGS. 6-8 show modifications of the apparatus shown in FIG. 5. In FIG. 6, the encasing tube 102 has a plurality of screen tubes 112. This design will give a much larger screen surface area than would be given by a single screen tube 104 as shown in FIG. 5.

In the embodiment of FIG. 7, a plurality of screen tubes 114 having a rectangular cross-sectional configuration is employed.

Finally, in FIG. 8, a plurality of concentric tubes is employed. This embodiment has a central screen tube 116 surrounded by a cylinder 118, which does not permit the passage of liquids. The cylinder 118 is surrounded by an outer screen tube 120, which, in turn, is surrounded by the encasing tube 102. Thus, the influent zone is formed by the interior of the central screen tube 116. A second influent zone is formed by the cylinder 118 and the outer screen tube 120. Effluent zones are formed between the central screen tube 116 and the cylinder 118, and also between the outer screen tube 120 and the encasing tube 102.

The operation of the screen tube units shown in FIGS. 5-8 is similar in principle to the operation of the water treatment apparatus shown in FIGS. 1-3. The directional component of the liquid and suspended solids parallel to the screen is controlled by the flow rate at which the liquid is passed through the screen tube, and the directional component through the screen is controlled by pressure. These components should be controlled within the limits previously mentioned.

It should be borne in mind that the embodiments shown in FIGS. 5-8 may be modified to reverse the direction of liquid flow. That is, in the embodiment shown in FIG. 5, for example, liquid containing suspended solids could be delivered to the area between the screen tube 104 and the encasing tube 102, so that the influent and effluent zones can be reversed.

Figure 9:
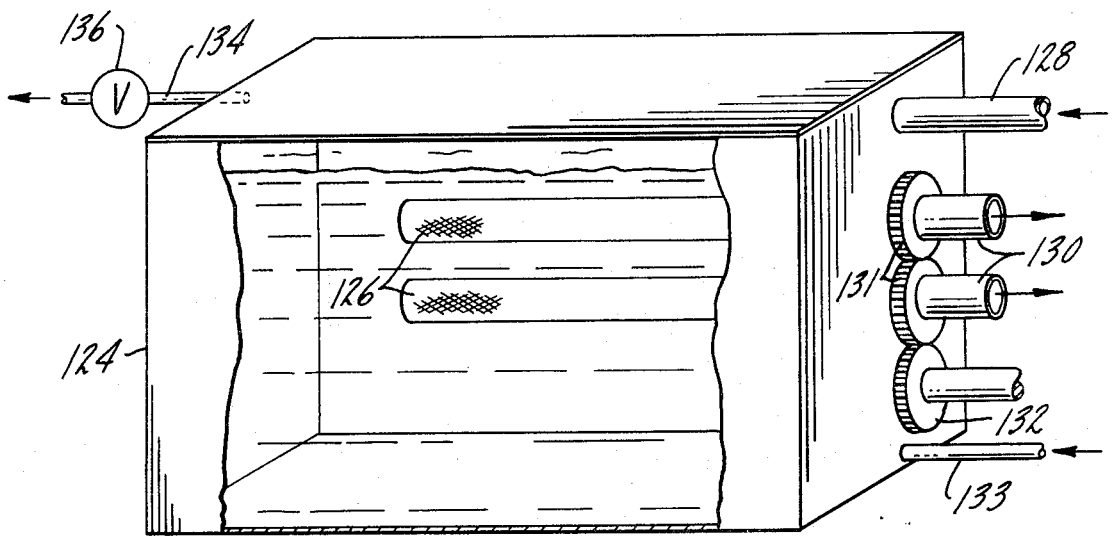
FIG. 9 is a perspective view of yet another embodiment of the present invention, partially cut away to show the interior details thereof.

FIG. 9 shows yet another type of apparatus that may be constructed in accordance with the present invention. This embodiment employs a closed tank 124 having a pair of rotatable screen tubes 126 projecting into the interior thereof. Liquid containing suspended solids is delivered to the tank 124 through an inlet pipe 128, and a coating is formed on the screen tubes 126. Filtered liquid passes out of the tank through outlet pipes 130 communicating with the interior of the screen tubes 126. A velocity component parallel to the surface of the screen tubes 126 is obtained by rotating the screen tubes 126 within the liquid. To this end, each screen tube 126 is mounted for rotation, and has an external gear 131. These external gears 131 are driven by a drive gear 132, which, in turn, is connected to suitable drive means (not shown).

If it is desired to aerate the liquid and suspended solids, suitable aeration means may be employed, such as an air inlet pipe 133, communicating with suitable air distributors (not shown) inside the tank 124.

The tank 124 shown in FIG. 9 is preferably fully enclosed, and has an air outlet pipe 134 having a pressure control valve 136 for controlling pressure within the tank 124. The pressure within the tank 124, in turn, controls the rate of flow of liquid through the screen tubes 126.

The preferred use for the method and apparatus of the present invention is in connection with waste removal processes that use activated sludge. The mixed liquor containing the activated sludge forms an excellent coating on the screen, effectively preventing significant amounts of suspended solids from being transferred to the effluent zone. While this coating is found primarily on the upstream side, examination of the screen shows the growth of bacterial colonies within the interstices of the screen network, and even some growth on the downstream side.

The following examples are intended to illustrate the present invention, and should not be construed as limitative, the scope of the invention being determined by the appended claims.

EXAMPLE I

An apparatus similar in appearance to that shown in FIG. 1 was constructed utilizing a tank having transparent plastic side walls and a nylon screen having a plain square weave, and having openings of 44 microns. The influent zone contained a mixed liquor which was primarily a suspension of activated sludge. A series of tests was conducted using, alternately, domestic sewage, a glucose solution, and particles of dog food as the waste material added to the activated sludge to form a mixed liquor for treatment. Total mixed liquor suspended solids were maintained in the range of about 2000 to 6000 milligrams per liter. When the mixed liquor suspended solids reached a level of 6000 milligrams per liter, the unit was shut down, and solids were removed to return the solids level to about 2000 mg./l. Flow rate through the screen was maintained at about 10.5 gallons /square foot /day. Air was injected into the influent zone at a rate sufficient to produce a directional component of the liquid across the screen of about 2 to 2.5 feet per second. This value was determined by measuring the velocity at which particles in the liquid are carried past the screen surface, as observed through the sides of the tank. These particles are known to have a specific gravity close to that of the water.

Measurements of the suspended solids in the effluent liquid were periodically made. After one day of operation, the suspended solids in the effluent averaged about 104 mg./l. At the end of the second day, the effluent suspended solids had been reduced to 46 mg./l., and at the end of the third day were reduced to 22 mg./l. The suspended solids in the effluent reached a steady state after about 7 to 10 days when they averaged about 10 mg./l. showing that the proper level of coating had been built up and was being maintained on the screen.

Examination of the layer of solids on the screen indicated that it was relatively thin (no more than one or two millimeters). However, precise measurements could not be made because the layer collapsed when removed from its aqueous environment. Some material, including bacterial growth, was also found within the screen network, and a small amount was found on the downstream side.

EXAMPLE II

Example I was repeated except that a square-weave nylon screen having openings of 74 microns was substituted for the screen having openings of 44 microns. The results were similar except that the steady-state suspended solids in the effluent averaged only 30 mg./l. This indicated that the larger screen size was not as efficient in holding the coating.

EXAMPLE III

Example I was repeated except that a square-weave nylon screen having openings of 105 microns was empolyed. In this instance, the steady-state suspended solids level averaged about 69 mg./l., which was considered excessively high.

EXAMPLE IV

Example I was repeated except that a square-weave Dacron polyester screen was used instead of a nylon screen. In this instance, the Dacron screen has openings of about 44 microns. Once the proper coating was built up on the screen, effluent suspended solids averaged about 9 mg./l.

EXAMPLE V

Example IV was repeated, except that the Dacron screen had pore openings of about 74 microns. In this instance, after the pre-coat had been built up on the screen, effluent suspended solids averaged about 5 mg./l. This is in marked contrast to the 30 mg. /l. obtained in Example II with the same size nylon screen, and indicates that the Dacron screen was significantly more efficient in maintaining a proper pre-coat layer. It is also significant that the suspended solids in the effluent were lower in this example than in Example IV even though the openings in the screen were larger. This result indicates that there is an optimum level for pore openings and that a deleterious effect may be produced by openings that are too small as well as openings that are too large.

EXAMPLE VI

Example IV was repeated, except that the Dacron screen had openings of 105 microns. Effluent suspended solids in this test averaged 24 mg./l. While this represents an acceptable level in some applications, it is clear that the use of the larger pore openings had a deleterious effect upon the ability of the screen to hold the coating layer properly, and thus to interrupt the passage of suspended solids.

Obviously, many modifications and variations of the invention as hereinbefore set forth will occur to those skilled in the art, and it is intended to cover in the appended claims all such modifications and variations as fall within the true spirit and scope of the invention.

We claim:

1. A method for removing suspended solids from liquids comprising: delivering liquid containing suspended solids to a screen with a directional component across the screen surface and a directional component through said screen, said screen having openings large enough to pass the majority of said suspended solids, and said screen having the ability to hold a coating of said solids on the upstream side thereof; controlling the flow of said liquid containing said suspended solids so that a coating of said suspended solids is formed on said screen surface; continuing the delivery of liquid containing suspended solids to said screen with a directional component across said screen and a directional component through said said screen, whereby to filter solids from said liquid passing through said coating and screen; and controlling the relationship between said directional components to maintain said coating on said screen.

2. The method as defined in claim 1 wherein said suspended solids comprise activated sludge.

3. The method as defined in claim 2 further including the step of aerating said liquid and said suspended solids prior to delivery to said filter.

4. The method as defined in claim 2 wherein said screen is constructed of Dacron and said openings are in the range of about 10 to 100 microns.

5. The method as defined in claim 4 wherein said openings are in the range of about 50 to 90 microns.

6. The method as defined in claim 2 wherein said screen is constructed of nylon and said openings are in the range of about 10 to 100 microns.

7. The method as defined in claim 2 wherein said directional component across said screen is no greater than about 5 feet per second.

8. The method as defined in claim 2 wherein said directional component across said screen is about 1 – 3 feet per second.

9. The method as defined in claim 2 wherein said directional component across said screen is no greater than about 10 feet per second.

10. The method as defined in claim 9 wherein the directional component through said screen is about 4 to 300 gallons per square foot per day.

11. The method as defined in claim 9 wherein the directional component through said screen is about 5 to 50 gallons per square foot per day.

12. The method as defined in claim 11 wherein said directional component across said screen is about 1 – 3 feet per second.

13. A method for removing suspended solids from liquids, said suspended solids comprising activated sludge, said method comprising: delivering liquid containing said suspended solids to a Dacron screen having openings large enough to pass the majority of said suspended solids, said openings being in the range of about 10 to 100 microns, with a directional component across said screen and a directional component through said screen, said directional component across said screen being no greater than about 10 feet per second, and said directional component through said screen being about 4 to 300 gallons / square foot / day, whereby to form a coating of said solids on said screen surface; continuing the delivery of liquid containing said suspended solids to said screen with said directional components across and through said screen, whereby to filter solids from said liquid passing through said coating and screen; and controlling the relationships between said directional components to maintain said coating on said screen.

14. The method as defined in claim 13 wherein said directional component through said screen is about 5 to 50 gallons / square foot / day.

15. The method as defined in claim 14 wherein said directional component across said screen is about 1 to 3 feet per second.

* * * * *